United States Patent
Wang et al.

(10) Patent No.: US 10,484,701 B1
(45) Date of Patent: *Nov. 19, 2019

(54) RENDITION SWITCH INDICATOR

(71) Applicant: Amazon Technologies, Inc., Seattle, WA (US)

(72) Inventors: Qi Keith Wang, Cambridge (GB); Yueshi Shen, Cupertino, CA (US); Yongjun Wu, Bellevue, WA (US); Tarek Amara, Burlington (CA); Naushirwan Navroze Patuck, Cambridge (GB); Ilya Vladimirovich Brailovskiy, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/345,865

(22) Filed: Nov. 8, 2016

(51) Int. Cl.
| | | |
|---|---|---|
| H05B 3/06 | (2006.01) | |
| H05B 3/20 | (2006.01) | |
| B60R 11/04 | (2006.01) | |
| G02B 27/00 | (2006.01) | |
| H04N 7/18 | (2006.01) | |
| H04N 19/503 | (2014.01) | |
| H04N 19/159 | (2014.01) | |
| H04N 19/40 | (2014.01) | |

(52) U.S. Cl.
CPC ......... *H04N 19/503* (2014.11); *H04N 19/159* (2014.11); *H04N 19/40* (2014.11)

(58) Field of Classification Search
CPC .... H04N 19/156; H04N 19/184; H04N 19/40; H04N 21/23424; H04N 21/4382; H04N 21/6379; H04N 21/647; H04N 21/2353; H04N 19/70; H04N 21/44016; H04N 21/44209; H04N 21/6377; H04N 21/8455; H04N 21/8456
USPC .................................. 375/240.01–240.29
See application file for complete search history.

(56) References Cited

U.S. PATENT DOCUMENTS

| | | | |
|---|---|---|---|
| 8,402,494 B1 * | 3/2013 | Hu .................. | H04N 5/268 709/230 |
| 9,131,110 B2 | 9/2015 | Yassur et al. | |

(Continued)

OTHER PUBLICATIONS

Author unknown; H.264/MPEG-4 AVC; Retrieved from https://en.wikipedia.org/wiki/H.284/MPEG-4_AVC on Nov. 8, 2016; 15 pgs.

(Continued)

*Primary Examiner* — Nathnael Aynalem
(74) *Attorney, Agent, or Firm* — K&L Gates LLP

(57) ABSTRACT

Methods to switch between renditions of a video stream are generally described. In some examples, the methods may include encoding a video stream at a first image quality in a first rendition and a second, lower image quality in a second rendition. The methods may further include sending the first rendition to a recipient computing device. The methods may include receiving a request to switch from the first rendition to the second rendition. The methods may include determining that first indicator data of a first inter-coded frame indicates that the video stream can be switched to a lower image quality rendition at the first inter-coded frame. In some examples, the methods may further include sending the second rendition to the recipient computing device.

17 Claims, 9 Drawing Sheets

(56) References Cited

U.S. PATENT DOCUMENTS

| | | |
|---|---|---|
| 9,788,077 B1 | 10/2017 | Shen et al. |
| 9,854,270 B2 | 12/2017 | Ramasubramonian et al. |
| 2004/0001547 A1* | 1/2004 | Mukherjee ............. H04N 19/51 |
| | | 375/240.16 |
| 2005/0012647 A1* | 1/2005 | Kadono .............. H03M 7/4006 |
| | | 341/67 |
| 2006/0188025 A1 | 8/2006 | Hannuksela |
| 2012/0185570 A1* | 7/2012 | Bouazizi .......... H04N 21/44016 |
| | | 709/219 |
| 2013/0089142 A1* | 4/2013 | Begen ............. H04N 21/23424 |
| | | 375/240.12 |
| 2014/0082054 A1 | 3/2014 | Denoual et al. |
| 2015/0085927 A1* | 3/2015 | Sjoberg .................. H04N 19/70 |
| | | 375/240.12 |
| 2015/0334420 A1 | 11/2015 | DeVleeschauwer et al. |
| 2016/0191931 A1* | 6/2016 | Hannuksela ......... H04N 19/105 |
| | | 375/240.12 |
| 2016/0330453 A1* | 11/2016 | Zhang .................. H04N 19/895 |
| 2017/0359596 A1 | 12/2017 | Kim et al. |

OTHER PUBLICATIONS

Autor unknown: Adaptive Bitrate Streaming; Retrieved from https://en.wikipedia.org/wiki/Adaptive_bitrate_streaming on Nov. 8, 2016; 4 pgs.

* cited by examiner

| frame_type | Name of frame_type |
|---|---|
| 0 | KEY_FRAME |
| 1 | NON_KEY_FRAME |
| 2 | S_FRAME |
| 3 | Reserved |

RENDITION SWITCH INDICATOR

BACKGROUND

Video and/or other media may be sent between computing devices over a network. In some examples, videos may be encoded by a server, sent to a client computing device, decoded and played back while subsequent portions of the video are still being transmitted to the client computing device by the server. Such video transmission and playback is often referred to as "streaming". Network conditions can change during streaming due to changes and/or increases in network traffic. For example, network conditions may sometimes deteriorate which may lead to delays in streaming of video and/or other media files.

Provided herein are technical solutions to improve sending of video and other types of data that may reduce problems associated with changing network conditions.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 is a table showing another example encoding of rendition switch indicator that may be used in accordance with the present disclosure.

DETAILED DESCRIPTION

Figure 1:
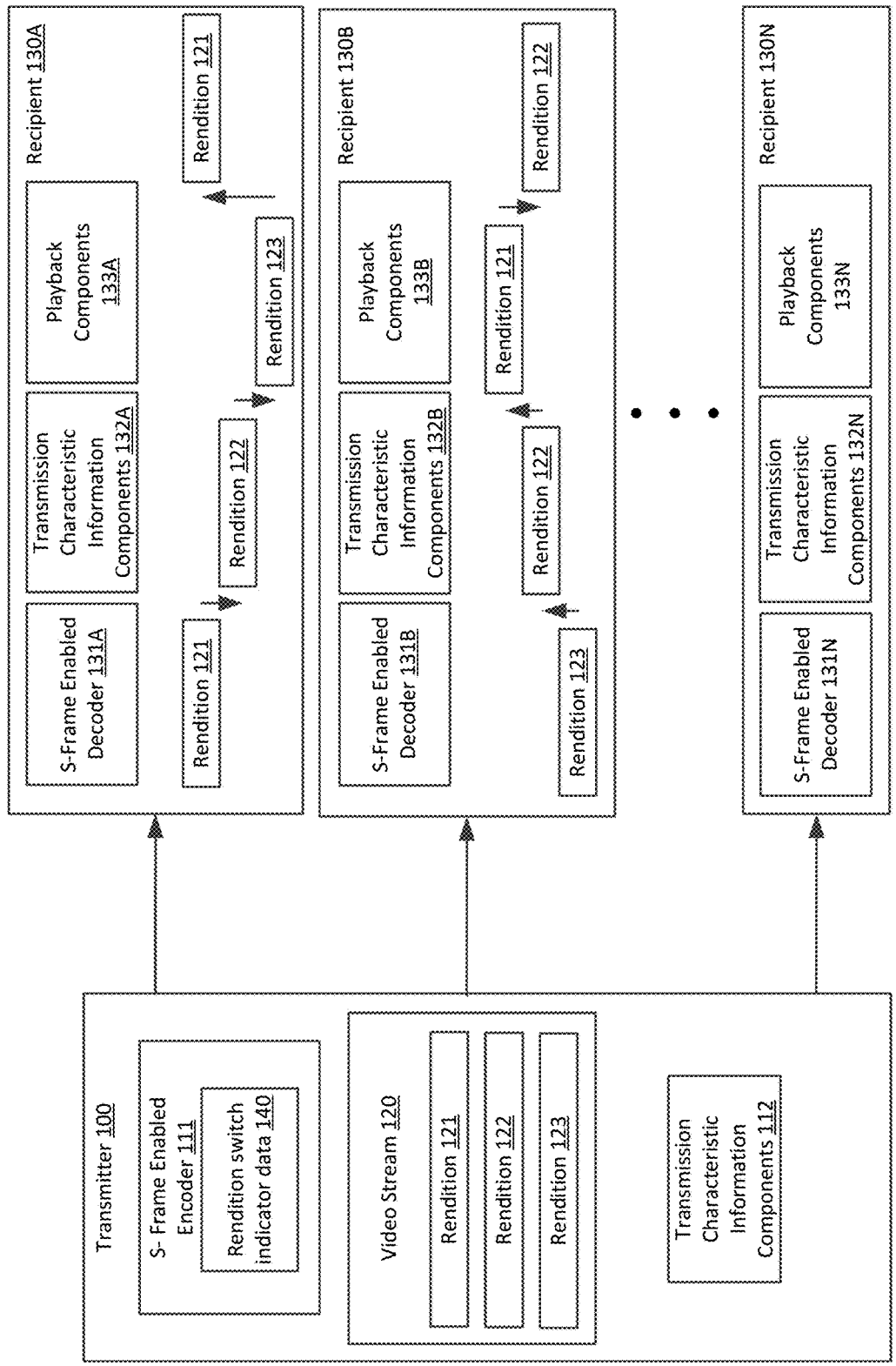
FIG. 1 is a diagram illustrating an example system for improved rendition switching for adaptive bitrate streaming that may be used in accordance with the present disclosure.

The transmission and presentation of information using streaming delivery technology is rapidly increasing. Various forms of streaming technology and, in particular, hypertext transfer protocol (HTTP) streaming, may employ adaptive bitrate streaming, in which a video stream is encoded using multiple renditions that may differ with respect to various transmission attributes (e.g., bitrates, resolutions, profiles, frame rates, etc.). A recipient may then determine which rendition to download depending on various transmission characteristics, such as network conditions (e.g., available network bandwidth, throughput, etc.), computational resources (e.g., recipient processor usage, recipient memory usage, etc.), decoder compatibility, and others. In adaptive bitrate streaming, video streams are encoded into small segments (typically 2-10 seconds). Segments of video streams comprise frames of image data. Each frame comprises columns and rows of pixels, with each pixel having a pixel value affecting how the pixel looks to the human eye. Each segment of a video starts with a key frame. A key frame is a special intra-coded picture frame that resets the decoding process, so that no following video frames can reference any picture prior to the key frame. This means that each segment is self-decodable (i.e., doesn't depend on reference pictures in previous segments). Also, segments of different renditions are time aligned (i.e., for segments of different renditions, the presentation timestamp (PTS) of the first frames as well as the durations are the same). Therefore, the recipient can switch from one rendition to another seamlessly. Key frames may sometimes be referred to as long term reference frames.

One challenge related to adaptive bitrate streaming is the desire to reduce end-to-end latency while maintaining a sufficiently high video quality. In adaptive bitrate streaming, larger segment durations may tend to increase latency. Thus, one simple technique for reducing latency involves the reduction of segment duration. However, the reduction of segment duration may result in more frequent transmission of key frames, which have large data sizes and are expensive and inefficient to encode. Thus, while reduction of segment duration may reduce latency, a resulting increased frequency of key frames may result in negative effects, such as decreased image quality and image fidelity.

Techniques for improved rendition switching in association with adaptive bitrate streaming are described herein. As set forth above, in conventional adaptive bitrate streaming, switching between different renditions may occur only at key frames that initiate each segment. By contrast, in addition to key frames, the disclosed techniques may also allow switching between segments at a new frame type: an S-frame. S-frames may be inter-coded frames at which rendition-switching from a higher quality rendition to a lower quality rendition may occur. A switch from a higher quality rendition to a lower quality rendition at an S-frame may comprise ceasing to send the currently streamed, higher quality rendition and then sending a lower quality rendition beginning with an S-frame. By allowing rendition switching at S-frames, the disclosed techniques may improve efficiency by, for example, reducing end-to-end latency without causing an undesirable decrease in image quality and image fidelity. Additionally, in some cases, switching at S-frames may allow more frequent switching, which may enable switching to become more responsive to changes in transmission characteristics.

In some examples, rendition switching at S-frames may be employed only when switching to a lower image quality rendition (e.g., lower bitrate, lower resolution, etc.), which may sometimes be referred to as switching down. Also, in some examples, rendition switching at key frames may be employed when switching down to a lower image quality rendition and/or when switching to a higher image quality rendition (e.g., higher bitrate, higher resolution, etc.), which may sometimes be referred to as switching up. Thus, in some examples, switching down may be accomplished using S-frame switching, key frame switching or both. By contrast, in some examples, switching up may be accomplished using only key frame switching. In some cases, switching down at S-frames and/or key frames and switching up only at key frames may provide a number of advantages. For example, in some cases, switching down at S-frames may allow reduction of end-to-end latency as well as more frequent and responsive switching when transmission characteristics are becoming less favorable. In some cases, however, such as when a next key frame is closer than (e.g., will be transmitted and/or received prior to) a next S-frame, it may still be more beneficial to switch down at a key frame. By contrast, in some cases, switching up may be accomplished using only key frame switching because, for example, key frames may allow the recipient to continue to benefit from the clean switching characteristics of key frames when transmission characteristics are becoming more favorable.

In some examples, not all inter-coded frames may support rendition switching. For example, in some cases, a special type of inter-coded frame (referred to hereinafter as an S-frame) may be designated as an inter-coded frame that supports switching to a lower-quality rendition beginning with the S-frame. By contrast, other inter-coded frames (such as "P-frames" and "B-frames" of the H.264 video streaming standard, for example) may not support rendition switching. Frames may be designated as S-frames, key frames, and/or non-key frames by header data, frame type syntax data, and/or other rendition switch indicator data. In some examples, to allow for efficient rendition switching, rendition switch indicator data may provide an indication instructing a decoder of an S-frame to disable temporal motion vector prediction to decode the S-frame. In some cases, temporal motion vector prediction may be disabled for S-frames because the reference frames for an S-frame are included in a different rendition than the S-frame, and their temporal motion vector information may, therefore, be invalid and may cause distortion if applied to the S-frame.

Another characteristic of S-frames is that they may also be generated by predicting pixel information from reference frames having higher resolutions. Thus, for example, generation of S-frames may sometimes include downscaling of pixel information from reference frames of higher resolution. By contrast, various other inter-coded frames may be generated by predicting pixel information from reference frames of the same resolution, and scaling may therefore not be advantageous for generation and/or decoding of non-S-frame inter-coded frames. In various examples, S-frames may provide an indication prompting a decoder of a recipient client device (such as S-frame enabled decoders 131A, 131B, . . . , 131N) to flush (i.e., delete) all reference pictures in the reference picture buffer after decoding the S-frame, so that no following video frames can reference any picture prior to the S-frame. Using S-frames as well as key frames to trigger buffer flushes after decoding may allow for smaller buffer sizes since segment size may be reduced due to the ability to switch renditions at both S-frames and key frames. Since larger buffer size may cause longer end-to-end broadcast latency, reducing the buffer size may decrease overall latency of video transmission. S-frames may also provide an indication prompting an S-frame enabled decoder to reset the segmentation map, loop filter, and probability tables of the S-frame enabled decoder. The segmentation map, loop filter and/or probability tables may describe decoder states that may persist across one or more frames of a video. The segmentation map may describe segment affiliation information for each macroblock in image data. Loop filter coefficients are parameters of the filtering process applied to the reconstruction of image data intended to reduce the visibility of macroblock edges. Probability tables record the probability context used in decoding syntax elements. In some examples, an S-frame may use previous frames as reference frames to decode the S-frame, but not subsequent frames in the video stream. As described previously, S-frames may provide instructions to flush the reference picture buffer after decoding the S-frame.

Although the techniques described herein are described in reference to key frames, S-frames, and inter-coded frames, in other examples the techniques may be instantiated in an H.264 video encoding environment. For example, some P-frames of the H.264 standard may be modified to include various characteristics of the S-frames described herein such that rendition-switching may occur at one or more modified P-frames from a higher quality rendition to a lower quality rendition. Similarly, the key frames described herein may be similar in functionality to instantaneous decoder refresh frames (IDR frames) of the H.264 standard. Accordingly, the techniques presented herein may be used in other video encoding and/or compression standards, such as H.264.

FIG. 1 is a diagram illustrating an example system for improved rendition switching for adaptive bitrate streaming that may be used in accordance with the present disclosure. As shown in FIG. 1 a transmitter 100 (e.g., one or more server computing devices) encodes a video stream 120, for delivery to recipients 130A-N (e.g., client computing devices) over one or more networks, for example a local area network (LAN) and/or a wide area network (WAN) such as the Internet. The video stream 120 may be transmitted from transmitter 100 and received and presented by recipients 130A-N using streaming technology, in which a collection of information may be presented by a recipient while also being transmitted to the recipient. For example, a prior portion of video stream 120 may be presented by a recipient at the same time that a subsequent portion of the video stream 120 is still being transmitted to the recipient. In some examples, the encoded and transmitted image information may correspond to a live or nearly-live (e.g., short time delay) transmission of an event, such as a playing of a video game, a news conference, a sporting event, and many others. A live or nearly-live transmission of an event that is delivered using streaming technology may often be referred to as live-streaming. It is noted however, that the transmission of information depicted in FIG. 1 is not limited to live or nearly-live transmission and may also include transmission of prior recorded events, media, or other information. In some examples, video stream 120 may be transmitted to recipients 130A-N as part of a large-scale video broadcast, in which video stream 120 is broadcast to a large quantity of recipients 130A-N. It is noted however, that the rendition switching techniques disclosed herein are not limited to large-scale video broadcasts and may also be employed for smaller-scale video broadcasts or even for video stream transmissions to a single recipient.

In the example of FIG. 1, transmitter 100 includes an S-frame enabled encoder 111 for encoding of video stream 120 for transmission to recipients 130A-N. Additionally, recipients 130A-N each include a respective S-frame enabled decoder 131A-N for decoding of video stream 120. Recipients 130A-N also include respective playback components 133A-N for playback of the transmitted video stream, such as media players, web browsers, and other playback components. In some examples, decoders 131A-N may be wholly or partially included within or integrated with respective playback components 133A-N. In some examples, video stream 120 may be transmitted using a communications protocol that is commonly employed for adaptive bitrate streaming, such as hypertext transfer protocol (HTTP). As set forth above, one characteristic of adaptive bitrate streaming is that a transmitted video stream may be encoded using a number of different renditions, which may each differ from one another with respect to one or more image quality-related attributes, such as bitrates, resolutions, profiles, frame rates, and others. As shown in FIG. 1, encoder 111 encodes video stream 120 using multiple renditions 121-123. Although the particular example of FIG. 1 depicts three renditions 121-123, it is noted that the rendition switching techniques disclosed herein may be employed with respect to any number of two or more renditions. In some examples, renditions 121-123 may each differ from one another with respect to one or more image quality-related attributes, such as the examples identified above. In one particular example, renditions 121-123 may differ from one another with respect to their respective resolutions. For example, rendition 121 may be a high-quality rendition that has a higher resolution than renditions 122 and 123. Rendition 122 may be a mid-quality rendition that has a lower resolution than rendition 121 and a higher resolution than rendition 123. Rendition 123 may be a low-quality rendition that has a lower resolution than renditions 121 and 122.

As also described above, another characteristic of adaptive bitrate streaming is that a particular one of the multiple available renditions 121-123 may be selected for each recipient 130A-N. Additionally, during the course of the video transmission, each recipient 130A-N may switch between renditions, sometimes frequently, based on various factors. In some examples, the selection and switching of renditions may be based on various transmission characteristics, such as network conditions (e.g., available network bandwidth, throughput, etc.), computational resources (e.g., recipient processor usage, recipient memory usage, etc.), decoder compatibility, and others. In some examples, different transmission characteristics may exist with respect to transmission of video stream 120 via a communication path between transmitter 100 and recipients 130A-N. For example, a network connection between transmitter 100 and recipient 130A may be experiencing favorable conditions, while a network connection between transmitter 100 and recipient 130B may simultaneously be experiencing poor conditions. Additionally, network conditions for each particular recipient 130A-N may also change over time during the course the transmission of video stream 120. For example, at the start of transmission of video stream 120, a network connection between transmitter 100 and recipient 130A may be experiencing favorable conditions, but these conditions may sometimes change, in some cases very quickly, and become less favorable, such as based on other network communications usages or for other reasons. Other transmission characteristics may also experience various changes for each recipient 130A-N during the course of a video broadcast or other transmission.

As shown in FIG. 1, some examples of rendition selection and switching are depicted for recipients 130A and 130B. For example, FIG. 1 shows that recipient 130A initiates the transmission of video stream 120 by receiving high-quality rendition 121 (as shown by rendition 121 being the first rendition listed within the respective box for recipient 130A). In some examples, high-quality rendition 121 may be selected for recipient 130A based on recipient 130A experiencing favorable transmission characteristics, such as a high available network bandwidth and/or low central processing unit (CPU) usage. However, as shown in FIG. 1, after receiving a first portion of the video transmission using rendition 121, recipient 130A switches down to receive mid-quality rendition 122 (as shown by the downward arrow pointing from first rendition 121 to second rendition 122). This switching down to mid-quality rendition 122 may be caused, for example, by a downgrade of transmission characteristics, such as a reduction in available network bandwidth and/or an increase in CPU usage. Recipient 130A again switches down from mid-quality rendition to 122 to low-quality rendition 123, for example based on a further downgrade in transmission characteristics. Recipient 130B then switches back up from rendition 123 to rendition 121, for example based on an upgrade in transmission characteristics.

As also shown in FIG. 1, recipient 130B initiates the transmission of video stream 120 by receiving low-quality rendition 123 (as shown by rendition 123 being the first rendition listed within the respective box for recipient 130B). In some examples, low-quality rendition 123 may be selected for recipient 130B based on recipient 130B experiencing unfavorable transmission characteristics, such as a low available network bandwidth and/or high CPU usage. However, as shown in FIG. 1, after receiving a first portion of the video transmission using rendition 123, recipient 130B switches up to receive mid-quality rendition 122 (as shown by the upward arrow pointing from first rendition 123 to second rendition 122). This switching up to mid-quality rendition 122 may be caused, for example, by an upgrade of transmission characteristics, such as an increase in available network bandwidth and/or a decrease in CPU usage. Recipient 130B again switches up from mid-quality rendition to 122 to high-quality rendition 121, for example based on a further upgrade in transmission characteristics. Recipient 130B then switches back down from high-quality rendition 121 to mid-quality rendition 122 for example based on a downgrade in transmission characteristics.

In the example of FIG. 1, each of recipients 130A-N includes a respective transmission characteristic information component 132A-N, while transmitter 100 includes a transmission characteristic information component 112. Generally, components 132A-N and 112 may cooperate to obtain, receive, process, and update information associated with transmission characteristics. For example, in some cases, components 132A may monitor CPU usage and other computational resources on recipient 130A in order to determine computational resources that are used and/or available on recipient 130A. As another example, components 132A may operate alone and/or in combination with components 112 to determine available network bandwidth and other network conditions for communications between transmitter 100 and recipient 130A. Transmission characteristic information component 132A-N and 112 may then communicate and interact with decoders 131A-N and/or encoder 111 in order to allow selection and switching of renditions 121-123 for recipients 130A-N.

As set forth above, in conventional adaptive bitrate streaming techniques, video streams are encoded into segments, and each segment starts with a key frame. Additionally, in conventional adaptive bitrate streaming techniques, switching between renditions is permitted only at key frames (i.e., at the initiation of a segment). As also set forth above, in adaptive bitrate streaming, larger segment durations may tend to increase end-to-end latency. However, the reduction of segment durations requires more frequent transmission of key frames, which have large data sizes and are expensive and inefficient to encode. Thus, while reduction of segment duration may reduce latency, the resulting increased frequency of key frames may result in negative effects, such as decreased image quality and image fidelity. For these and other reasons, the disclosed techniques may allow switching between renditions at S-frames in addition to key frames. By allowing switching at S-frames, the disclosed techniques may improve efficiency by, for example, reducing end-to-end latency without causing an undesirable decrease in image quality and image fidelity. Additionally, in some cases, switching at S-frames may allow more frequent switching, which may enable switching to become more responsive to changes in transmission characteristics. Thus, S-frame enabled encoder 111 and S-frame enabled decoders 131A-N may allow switching between renditions at S-frames as will be described in detail below.

In accordance with embodiments of the present invention, S-frame enabled encoder 111 may encode inter-coded frames in renditions 121, 122, and/or 123 with rendition switch indicator data 140. Rendition switch indicator data 140 may be a flag or other indicator that may designate a particular frame as either a key frame, a non-key frame (e.g., an inter-coded frame at which rendition switching may not occur), an S-frame (e.g., an inter-coded frame at which rendition switching may occur), or another designation. Designation of a particular frame as an S-frame may indicate to an S-frame enabled decoder 131 (e.g., S-frame enabled decoders 131A, 131B, and/or 131N) that the particular frame may be generated and/or decoded using image data from a higher rendition. Similarly, designation of a particular frame as a non-key frame may indicate to an S-frame enabled decoder 131 that the particular frame should be generated using image data from the current rendition. As will be described in further detail below, rendition switch indicator data 140 may be used by an S-frame enabled decoder 131 (including S-frame enabled decoders 131A, 131B, and/or 131N) as an indication that temporal motion vector prediction should be disabled.

In some examples, S-frame enabled encoder 111, may encode the corresponding S-frames of different renditions of the video stream with the same content, although the resolution of the different corresponding S-frames may be different. For example, corresponding S-frames of all renditions may be encoded to specify reference frames having the same content (e.g., time-aligned reference frames). Accordingly, corresponding S-frames of different renditions may include the same reference frame index values denoted by ref-_frame_idx[i]. Additionally, S-frames and/or S-frame indicator data may specify the S-frame's resolution. Reference frames of S-frames may be from different (e.g., higher) resolutions and therefore the resolution of an S-frame must be specified and may not be derived from the reference frame of the S-frame.

Figure 2:
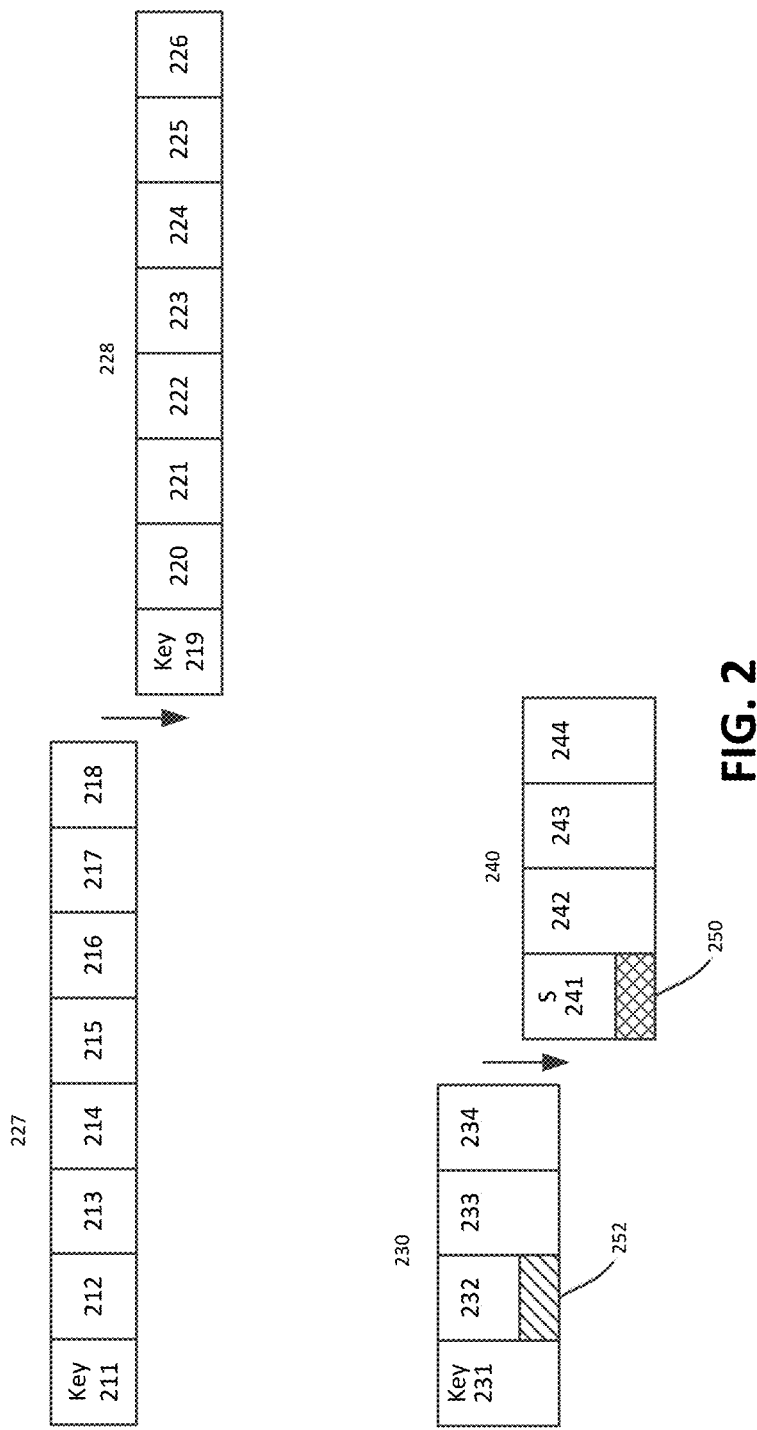
FIG. 2 is a diagram illustrating example key frame and S-frame rendition switches that may be used in accordance with the present disclosure.

FIG. 2 is a diagram illustrating example key frame and S-frame rendition switches that may be used in accordance with the present disclosure. In particular, the top portion of FIG. 2 depicts an example key frame switch between a first segment 227 at a higher image quality rendition and a second segment 228 at a lower image quality rendition. As shown, segment 227 includes a key frame 211, followed by inter-coded frames 212-218. Additionally, segment 228 includes a key frame 219, followed by inter-coded frames 220-226. Thus, as shown in FIG. 2, a rendition switch between segments 227 and 228 may occur at key frame 219, which is the first frame of segment 228. Additionally, the bottom portion of FIG. 2 depicts an example S-frame switch between a first segment 230 at a higher image quality rendition and a second segment 240 at a lower image quality rendition. As shown, segment 230 includes a key frame 231, followed by inter-coded frames 232-234. Additionally, segment 240 includes an S-frame 241, followed by inter-coded frames 242-244. Thus, as shown in FIG. 2, a rendition switch between segments 230 and 240 may occur at S-frame 241, which is the first frame of segment 240. S-frame 241 may include rendition switch indicator data 250. Rendition switch indicator data 250 may designate S-frame 241 as an S-frame, as opposed to other frame types. By contrast, inter-coded frame 232 of segment 230 may include rendition switch indicator data 252. Rendition switch indicator data 252 may designate inter-coded frame 232 as a non-key frame. S-frame enabled encoder 111, depicted in FIG. 1, may not be permitted to switch renditions at a non-key frame, such as inter-coded frame 232. Instead, S-frame enabled encoder 111 may only switch from a lower quality rendition to a higher quality rendition at a key frame. Similarly, S-frame enabled encoder 111 may only switch from a higher quality rendition to a lower quality rendition at an S-frame or a key frame.

It is noted that any or all of segments 227, 228, 230 and 240 may also be referred to as portions, as they constitute a portions of a transmitted video stream. Accordingly, as shown in FIG. 2, the ability to switch renditions at S-frames may serve to reduce segment duration without requiring more frequent transmission of key frames. For example, segments 230 and 240 both include fewer frames and have shorter duration than segments 227 and 228. In some examples, each of segments 227, 228, 230, and 240 may be requested by a recipient along with an indication of the particular rendition that is selected for receiving the respective segment. In some cases, segments may be requested using a request that corresponds to a particular protocol in which the video stream is transmitted. For example, if a video stream is being transmitted using HTTP protocol, than segments 227, 228, 230, and 240 may be requested using an HTTP request.

Figure 3:
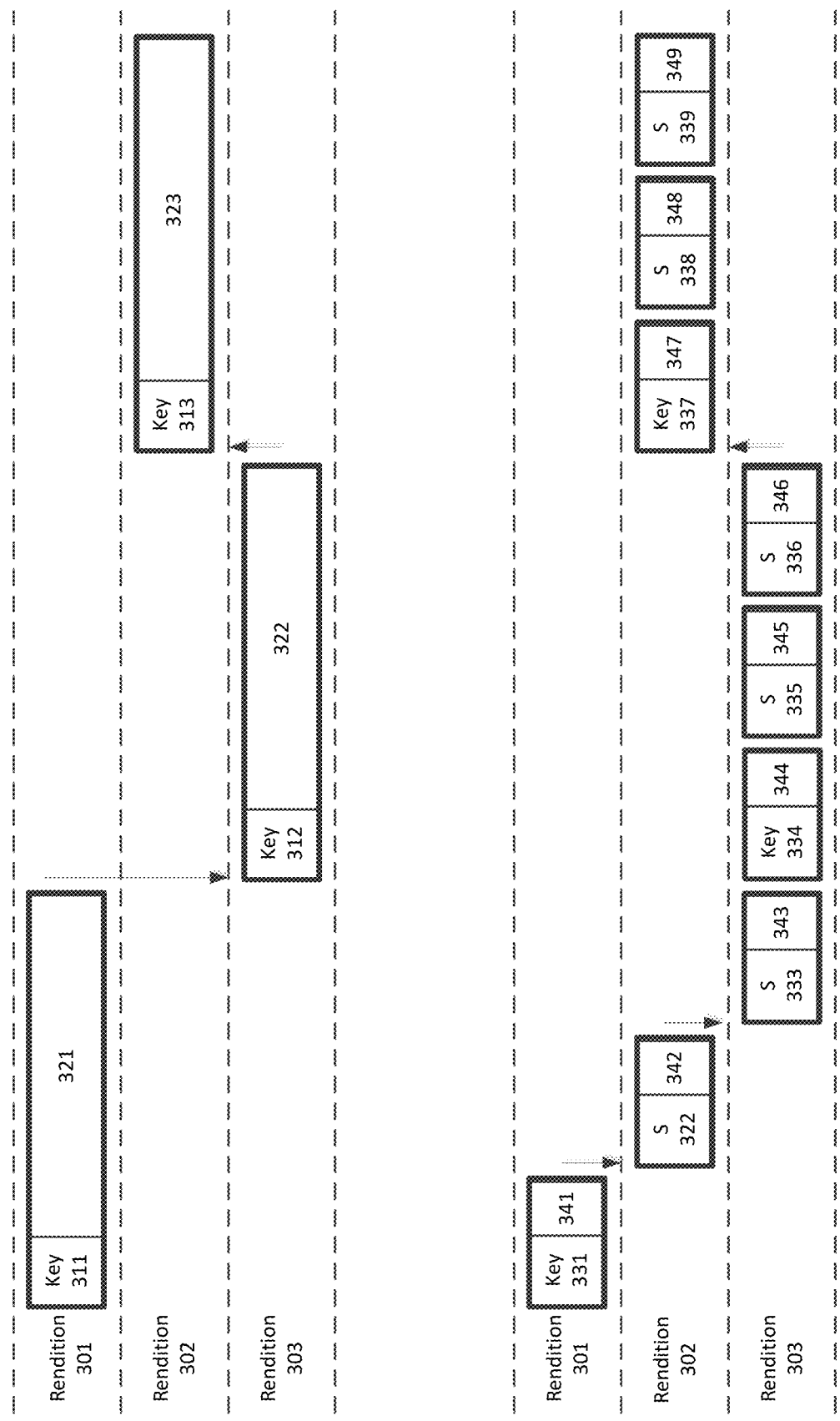
FIG. 3 is a diagram illustrating example key frame only switching and combined key frame and S-frame switching that may be used in accordance with the present disclosure.

In some examples, rendition switching at S-frames may be employed for a transmission only when a switched-to rendition has a lower image quality (e.g., lower bitrate, lower resolution, etc.) than a switched-from rendition, which may sometimes be referred to as switching down. Also, in some examples, rendition switching at key frames may be employed for a transmission when a switched-to rendition has a lower image quality than a switched-from rendition and/or when a switched-to rendition has a higher image quality (e.g., higher bitrate, lower resolution, etc.) than a switched-from rendition, which may sometimes be referred to as switching up. Thus, in some examples, switching down may be accomplished using S-frame switching, key frame switching or both. By contrast, in some examples, switching up may be accomplished using only key frame switching. The technique of switching down at S-frames and/or key frames and switching up only at key frames is referred to hereinafter as combined Key frame and S-frame switching. Referring now to FIG. 3, some examples of combined key frame and S-frame switching in comparison to key frame only switching will now be described in detail.

As shown, the top portion of FIG. 3 depicts example key frame only switching, such as may be employed in conventional adaptive bitrate streaming techniques. In the example of FIG. 3, a video stream is encoded into three renditions 301, 302 and 303. In the example of FIG. 3, the key frame only switching is initiated with a transmission of a first segment 321 that is encoded using rendition 301. Segment 321 starts with a key frame 311. Subsequent to segment 321, the video stream is switched down to rendition 303 (as shown by the downward arrow subsequent to segment 321). The next segment 322 is, therefore, encoded using rendition 303. Segment 322 starts with a key frame 312. Subsequent to segment 322, the video stream is switched up to rendition 302 (as shown by the upward arrow subsequent to segment 322). The next segment 323 is, therefore, encoded using rendition 302. Segment 323 starts with a key frame 313.

The bottom portion of FIG. 3 depicts example combined key frame and S-frame switching. In the example of FIG. 3, the combined key frame and S-frame switching is initiated with a transmission of a first segment 341 that is encoded using rendition 301. Segment 341 starts with a key frame 331. Subsequent to segment 341, the video stream is switched down to rendition 302. The next segment 342 is, therefore, encoded using rendition 302. Segment 342 starts with an S-frame 322. Subsequent to segment 342, the video stream is again switched down to rendition 303. The next segment 343 is, therefore, encoded using rendition 303. Segment 343 also starts with an S-frame 333. Segments 344, 345, and 346 are then transmitted without switching between renditions. Segment 344 starts with key frame 334. Segment 345 starts with S-frame 335. Segment 346 starts with S-frame 336. Subsequent to segment 346, the video stream is switched up to rendition 302. The next segment 347 is, therefore, encoded using rendition 302. As should be appreciated, in this example, because the video stream is switched up to a higher quality rendition, key frame switching is employed. Accordingly, in this example, segment 347 starts with a key frame 337. Segments 348 and 349 are then transmitted without switching between renditions. Segment 348 starts with S-frame 338. Segment 349 starts with S-frame 339. It is noted that there is no requirement that switching up or switching down must go from one rendition to an immediate higher or lower rendition. For example, although not shown in FIG. 3, a transmission may be switched down directly from rendition 301 to rendition 303 or may be switched up directly from rendition 303 to rendition 301.

In some cases, switching down at S-frames and/or key frames and switching up only at key frames may provide a number of advantages. For example, in some cases, switching down at S-frames may allow reduction of end-to-end latency as well and more frequent and responsive switching when transmission characteristics are becoming less favorable. In particular, as shown in FIG. 3, it can be seen that, during the duration in which segment 321 is transmitted using the key frame only switching technique, three separate segments 341, 342, and 343 are transmitted by allowing switching down at S-frames 322 and 333. Accordingly, in this example, it can be seen that S-frame down-switching may allow end-to-end latency to be reduced (in comparison to key frame only switching) by reducing segment duration and allowing three segments (i.e., segments 341, 342, and 343) to be transmitted in the same duration as a single segment 321. Additionally, in this example, it can be seen that S-frame down-switching has allowed a more rapid down-switch (in comparison to key fame only switching) from rendition 301 to rendition 302 and, subsequently, to rendition 303. More specifically, it is seen that S-frame down-switching allows down-switches to both rendition 302 (i.e., at S-frame 322) and rendition 303 (i.e., at S-frame 333) before the key frame only switching technique is able to make even a single down-switch from first segment 321. This more rapid and responsive switching may, in some cases, be particularly advantageous when transmission characteristics are becoming less favorable. This is because the less favorable transmission characteristics may not be capable of effectively supporting transmission of a current rendition that has too high of an image quality, thereby causing undesirable deterioration in playback conditions. It is noted, however, that, in some cases, a determination may be made to switch down to a lower quality rendition at a point in the transmission stream at which a next key frame is closer than (e.g., will be transmitted and/or received prior to) a next S-frame. In these scenarios, it may sometimes be more advantageous to switch down at the next key frame as opposed to waiting longer to switch down at the next S-frame, and key frame switching may therefore be employed. Thus, although FIG. 3 depicts some particular examples in which a transmission is switched down to a lower image quality rendition at S-frames, it is noted that switching may also sometimes be performed at key frames.

By contrast, switching up may occur in response to transmission characteristics that are becoming more favorable. Thus, when switching up, there is no (or little) concern that changing transmission characteristics will not support the transmission of a current rendition image quality. Accordingly, when switching up, the benefits of more rapid and responsive switching may sometimes be reduced in comparison to those benefits when switching down, and a more conservative approach may be employed. Therefore, when switching up, it may sometimes be advantageous to forgo the rapid response of S-frame switching in order to benefit from the clean switching characteristics of key frames.

As set forth above, in some examples, not all frames may support rendition switching. For example, in some cases, a special type of inter-coded frame (referred to hereinafter as S-frame) may be designated as an inter-coded frame that supports rendition switching. By contrast, other frames (referred to hereinafter as non-key frames) may not support rendition switching. Frames may be designated as S-frames, key frames, and non-key frames using rendition switch indicator data. Rendition switch indicator data may be provided using various techniques. For example, in some cases, rendition switch indicator data may be one or more bits provided in a transmitted bit stream. In some examples, rendition switch indicator data may be provided in a transmitted bit stream using an uncompressed frame header which includes a frame type field or other indicator data that indicates whether a respective frame is an inter-coded frame that supports rendition switching (i.e., is an S-frame) or is an inter-coded frame that does not support rendition switching (e.g., a non-key frame).

Figure 4:
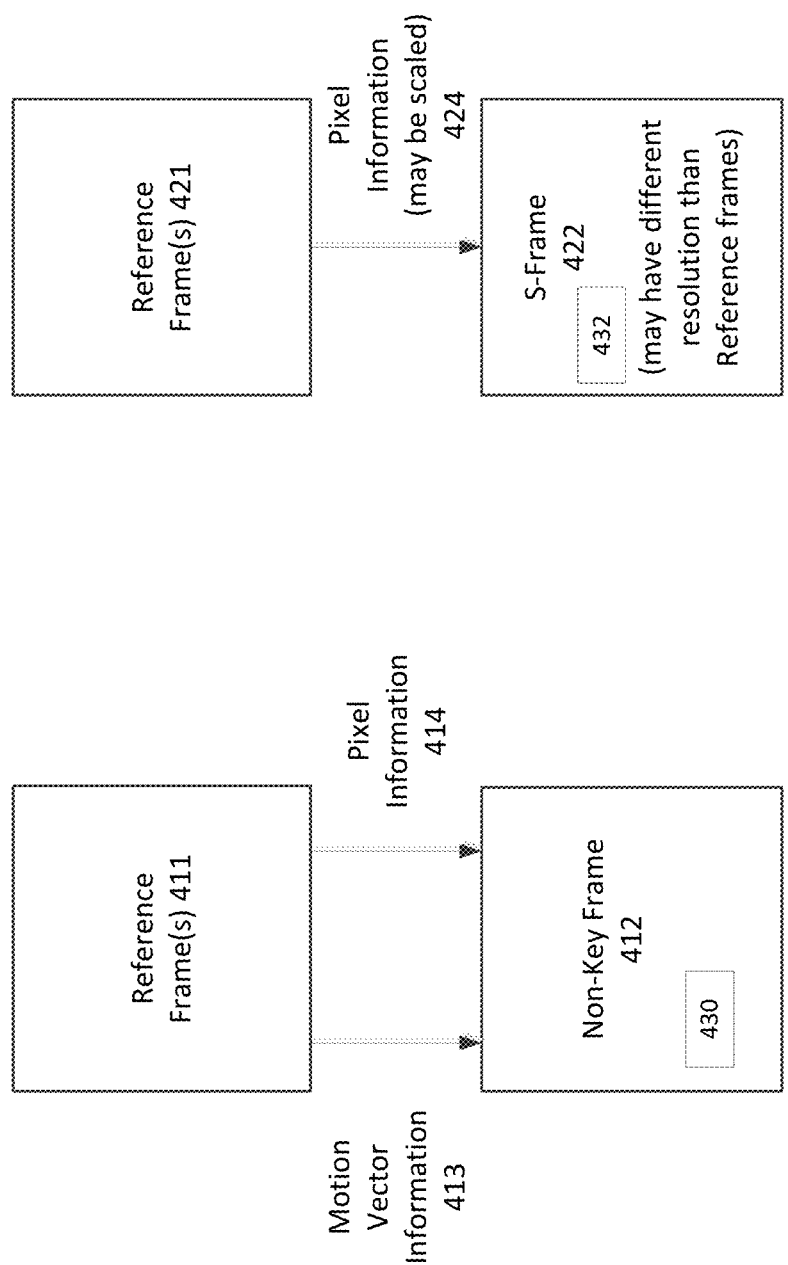
FIG. 4 is a diagram illustrating example characteristics of non-key frames and S-frames that may be used in accordance with the present disclosure.

In some examples, to allow for efficient rendition switching, S-frames may differ from non-key frames based on various characteristics. FIG. 4 is a diagram illustrating example characteristics of non-key frames and S-frames that may be used in accordance with the present disclosure. As shown in FIG. 4, an example non-key frame 412 is generated and/or decoded based, at least in part, on information from one or more respective reference frames 411. Non-key frame 412 may include rendition switch indicator data 430 designating the frame as a non-key frame. Rendition switch indicator data 430 may be encoded in an uncompressed frame header or other flag associated with non-key frame 412 by S-frame enabled encoder 111 (depicted in FIG. 1). For non-key frame 412, its reference frame(s) 411 may be transmitted as part of the same rendition as the non-key frame 412. Accordingly, reference frame(s) 411 may have the same resolution as non-key frame 412. As shown in FIG. 4, non-key frame 412 may be generated based on motion vector information 413 from its reference frame(s) 411 since reference frame 411 is of the same rendition. Motion vector information 413 may include, for example, information associated with motion compensation with respect to reference frame(s) 411, such as motion displacement vectors with respect to reference frame(s) 411, macroblock partition information, and other information. In some examples, prediction of motion vector information based on one or more reference frames may be referred to as "temporal motion vector prediction." Prediction of motion vector information based on neighboring macroblocks and/or partition information within the same frame or picture may be referred to herein as "spatial motion vector prediction." Non-key frame 412 is generated based on pixel information 414, such as pixel value data, from reference frame(s) 411. It is noted that, because non-key frame 412 may have the same resolution as its reference frame(s) 411, there may be no need to scale pixel information from reference frame(s) 411 for use in generating and/or decoding non-key frame 412.

As also shown in FIG. 4, an example S-frame 422 is generated based, at least in part, on information from one or more respective reference frames 421. S-frame 422 may include rendition switch indicator data 432 designating the frame as an S-frame. Rendition switch indicator data 432 may be encoded in an uncompressed frame header or other flag associated with S-frame 422 by S-frame enabled encoder 111 (depicted in FIG. 1). For S-frame 422, its reference frame(s) 421 may be transmitted as part of a different rendition than the S-frame 422. As previously noted, after decoding S-frame 422, S-frame 422 the reference picture buffer of the recipient device may be flushed. Reference frame(s) 421 may have a different resolution than S-frame 422 as reference frame(s) 421 may be from a different rendition. This is indicated in FIG. 4 by the words "may have different resolution than reference frames" included within S-frame 422. Because S-frame 422 may be included in a different rendition than reference frame(s) 421, temporal motion vector information from reference frame(s) 421 may be invalid and may cause distortion if applied to the S-frame 422. Accordingly, in the example of FIG. 4, while motion vector information 413 from reference frame(s) 411 is used to generate non-key frame 412, temporal motion vector information from reference frames 421 may be prohibited from being used to generate S-frame 422 and is therefore not shown in FIG. 4.

In the example of FIG. 4, S-frame 422 is generated based on pixel information 424, such as pixel value data, from reference frame(s) 421. However, because S-frame 422 may have a different resolution than reference frame(s) 421, the pixel information from reference frame(s) 421 may be scaled for use in generating S-frame 422. This is indicated in FIG. 4 by the words "may be scaled" that are displayed adjacent to pixel information 414. Further, in some examples, rendition switch indicator data 432 may indicate whether a custom scaling filter should be used to generate S-frame 422.

In particular, for cases in which S-frame switching is employed when switching down in image quality (e.g., as shown in FIG. 3), the reference frame(s) 421 may have a higher resolution than S-frame 422 and the pixel information 414 from reference frame(s) 421 may be downscaled for use in generating S-frame 422. A variety of different techniques may be employed for downscaling of pixel information from reference frame(s) 421. In one particular example, if the resolution of S-frame 422 is approximately half of the resolution of reference frame(s) 421, than the pixel information may be downscaled by, for example, selecting alternating pixels in the reference frame(s) 421 and generating pixel information 424 based on the selected alternating pixels. In other examples, more complex scaling algorithms may be employed, such as algorithms that may use of a selected portion (e.g., a selected percent or proportion) of pixel information from various pixels within the reference frames 421.

Figure 5:
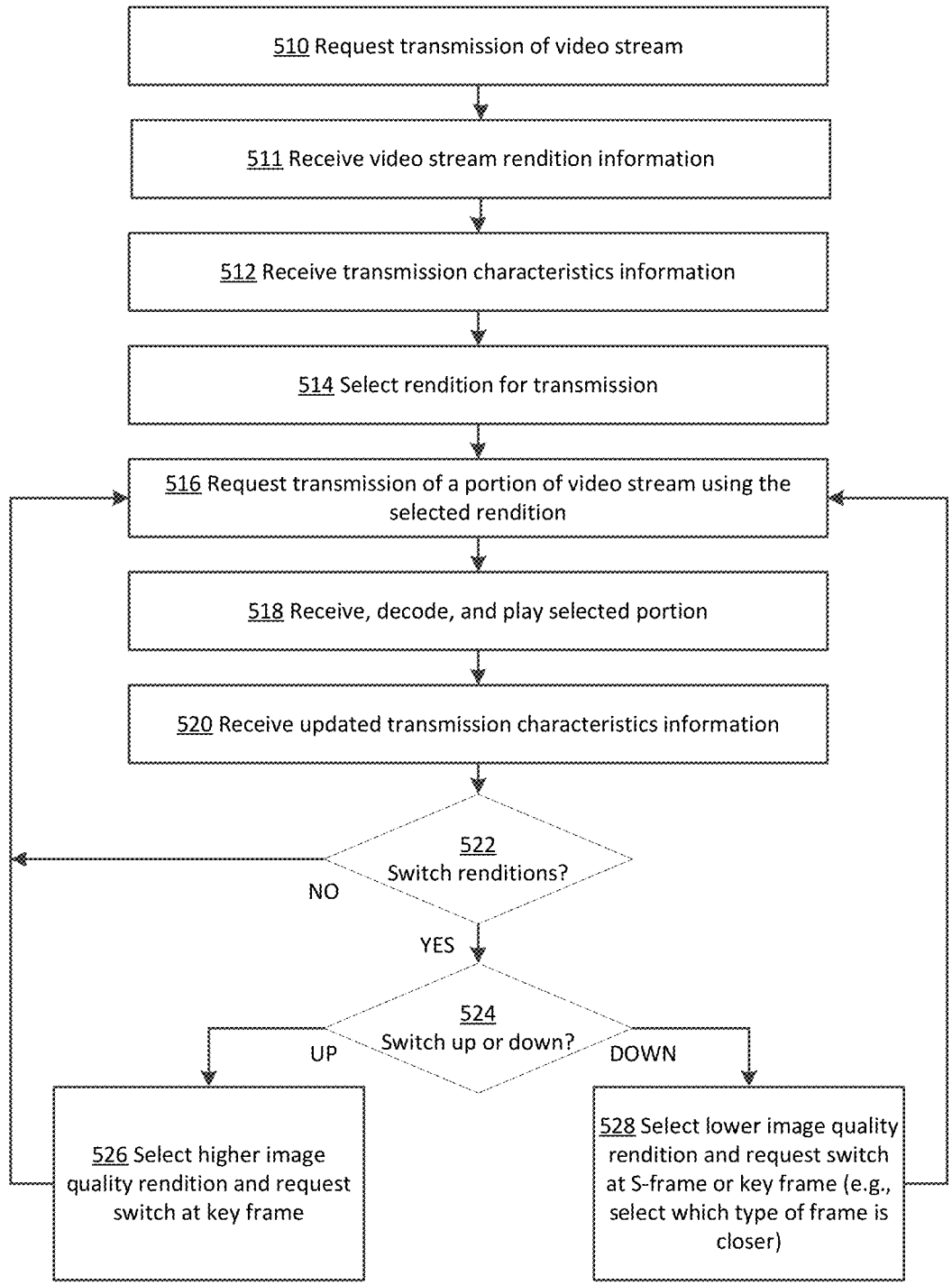
FIG. 5 is a flowchart illustrating a first example process for improved rendition switching for adaptive bitrate streaming that may be used in accordance with the present disclosure.

FIG. 5 is a flowchart illustrating a first example process for improved rendition switching for adaptive bitrate streaming that may be used in accordance with the present disclosure. In some examples, the process of FIG. 5 may be performed by a recipient (e.g., client) that receives a video streaming transmission, such as recipients 130A-N of FIG. 1. The process of FIG. 5 begins at operation 510, at which transmission of a video stream is requested. For example, a recipient, such as recipient 130A of FIG. 1, may issue a request to a transmitter (e.g., server), such as transmitter 100 of FIG. 1, for transmission of a video stream, such as video stream 120 of FIG. 1. In some examples, the transmission of the video stream may be requested as part of a broadcast to multiple recipients, such as a large-scale video broadcast. As set forth above, the requested video stream is transmitted using adaptive bitrate streaming techniques, in which the video stream is encoded using a plurality of different renditions having different image qualities with respect to one another. The renditions may differ from one another with respect to one or more image quality-related attributes, such as bitrates, resolutions, profiles, frame rates, and others. For example, as shown in FIG. 1, video stream 120 is encoded into three renditions 121, 122, and 123. In some examples, video stream rendition information may be received, for example from a server or other transmitter, that may include an indication of available renditions into which the video stream is encoded as well as indications of the respective characteristics (e.g., bitrates, resolutions, profiles, frame rates, and others) of each available rendition.

In some examples, the requested video stream may be transmitted using a communications protocol that is commonly employed for adaptive bitrate streaming, such as hypertext transfer protocol (HTTP).

At operation 512, transmission characteristics information is received. As set forth above, transmission characteristics may include characteristics associated with the transmission of a video stream, such as network conditions (e.g., available network bandwidth, throughput, etc.), computational resources (e.g., recipient processor usage, recipient memory usage, etc.), decoder compatibility, and others. For example, transmission characteristics information may be received by various transmission characteristics components, such as transmission characteristics information components 112 and 132A-N of FIG. 1.

At operation 514, a particular rendition is selected for transmission of the video stream. In some examples, the rendition may be selected based, at least in part, on transmission characteristics information. For example, in some cases, when transmission characteristics are generally more favorable (e.g., higher available network bandwidth, lower recipient CPU usage, etc.), a rendition with a generally higher image quality (e.g., higher bitrates, higher resolutions, etc.) may be selected. By contrast, in some cases, when transmission characteristics are generally less favorable (e.g., lower available network bandwidth, higher recipient CPU usage, etc.), a rendition with a generally lower image quality (e.g., higher bitrates, higher resolutions, etc.) may be selected.

At operation 516, transmission of a portion of a video stream is requested using the selected rendition. For example, a recipient may issue a request, such as an HTTP request, for a portion of the video stream (e.g., a segment of the video stream) to be transmitted using the selected rendition. At operation 518, the requested portion of the video stream is received, decoded, and played. For example, referring to FIG. 1, the requested portion of the video stream may be received by recipient 130A, decoded by decoder 131A, and played by playback components 133A, such as a media player, web browser, or other playback components.

At operation 520, updated transmission characteristics information is received. As set forth above, during the course of transmission of a video stream, one or more transmission characteristics may change relative to their prior state. For example, network conditions, such as available network bandwidth may change, for example when other network communications being received by the recipient are initiated, terminated, or otherwise modified. As another example, CPU usage by the recipient may change, for example when various processing tasks are initiated, terminated, or otherwise modified. In some examples, updated transmission characteristics information may be received by various transmission characteristics information components, such as transmission characteristics information components 112 and 132A-N of FIG. 1.

At operation 522, a determination is made as to whether to request a switch between transmission of a current rendition of the video stream and a different rendition of the video stream. In some examples, the determination as to whether to switch renditions may be made based, at least in part, on updated transmission characteristics information. For example, in some cases, when transmission conditions generally remain stable, a determination may be made not to switch renditions. By contrast, when transmission characteristics are generally becoming more favorable (e.g., increasing available network bandwidth, decreasing recipient CPU usage, etc.), a switch to a rendition with a generally higher image quality (e.g., higher bitrates, higher resolutions, etc.) may sometimes be made. By contrast, when transmission characteristics are generally becoming less favorable (e.g., decreasing available network bandwidth, increasing recipient CPU usage, etc.), a switch to a rendition with a generally lower image quality (e.g., higher bitrates, higher resolutions, etc.) may sometimes be made.

If, at operation 522, a determination is made to not switch renditions, then the process may return to operation 516, at which transmission of a subsequent portion of the video stream is requested using the previously selected rendition. By contrast, if, at operation 522, a determination is made to switch renditions, then the process proceeds to operation 524, at which it is determined whether to switch up (i.e., switch to a rendition with a higher image quality) or switch down (i.e., switch to a rendition with a lower image quality), for example using the criteria described in the above paragraph.

If, at operation 524, a determination is made to switch-up to a higher image quality rendition, then at operation 526 a higher image quality rendition is selected and a request is issued to switch to the selected higher image quality rendition at a key frame. For example, a recipient may issue a request, such as an HTTP request, for a portion of the video stream (e.g., a segment of the video stream) to be transmitted using the selected higher image quality rendition having a key frame as its initial frame. As set forth above, in some examples, when switching up to a higher image quality rendition, there may be no (or little) concern that changing transmission characteristics will not support the transmission of a current rendition image quality. For these and other reasons, when switching up, it may sometimes be advantageous to forgo the rapid response of S-frame switching in order to benefit from the clean switching characteristics of key frames.

If, at operation 524, a determination is made to switch-down to a lower image quality rendition, then at operation 528 a lower image quality rendition is selected and a request is issued to switch to the selected lower image quality rendition at an S-frame or at a key frame. For example, a recipient may issue a request, such as an HTTP request, for a portion of the video stream to be transmitted using the selected lower image quality rendition having either an S-frame or a key frame as its initial frame. The determination of whether to switch-down at an S-frame or at a key frame may be based, at least in part, on which type of frame is closer. In some examples, for cases in which a next S-frame is closer than (e.g., will be transmitted and/or received prior to) a next key frame, S-frame switching may be employed. By contrast, in some examples, for cases in which a next key frame is closer than (e.g., will be transmitted and/or received prior to) a next S-frame, key frame switching may be employed. As set forth above, in some examples, a determination to switch down to a lower image quality rendition may be based on deteriorating transmission characteristics that may not be capable of effectively supporting transmission of a current rendition that has too high of an image quality, thereby causing undesirable effects on playback conditions. For these and other reasons, when switching down, it may sometimes be advantageous to employ S-frame switching, which may allow for rapid and responsive rendition switching in cases where a next S-frame is received before a next key frame. By contrast, in cases where a next key frame is received before a next S-frame, key frame switching may sometimes be employed.

Upon receiving the selected lower image quality rendition, the recipient device may identify rendition switch indicator data of the first S-frame of the lower image quality rendition. The rendition switch indicator data may indicate that the initial frame of the lower image quality rendition is an S-frame. Further, the rendition switch indicator data may indicate that the S-frame should be decoded by referencing a corresponding frame of the higher image quality rendition (i.e. the "switched-from" rendition) that was previously transmitted prior to switching renditions. Rendition switch indicator data may further specify the resolution of the S-frame. A decoder of the recipient device (such as S-frame enabled decoder 131A depicted in FIG. 1) may decode the first frame (i.e. the S-frame) by referencing the corresponding S-frame of the higher image quality, switched-from rendition. For example, the decoder of the recipient device may use the corresponding S-frame of the switched-from rendition as a reference frame by selecting alternating pixels from the reference frame to generate the first S-frame of the lower image quality rendition. In some other examples, the rendition switch indicator data may indicate that a custom scaling filter should be employed when decoding the first S-frame of the switched-to lower image quality rendition. Accordingly, the decoder of the recipient device may use the specified custom scaling filter to generate the first P-frame of the switched-to rendition. Further, rendition switch indicator data may indicate that temporal motion vector prediction or temporal motion vector prediction and spatial motion vector prediction should be disabled for the S-frame of the lower image quality rendition.

Figure 6:
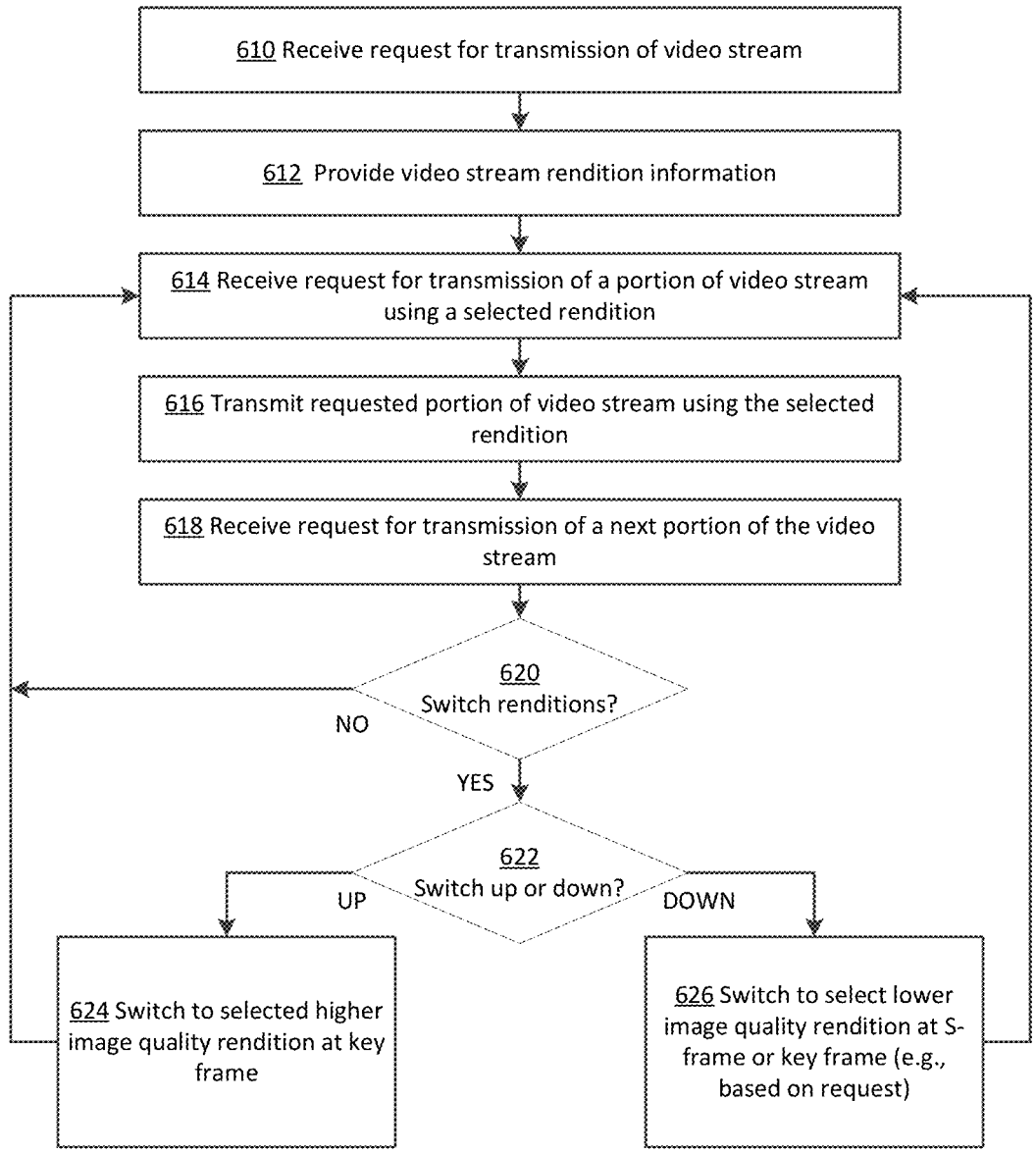
FIG. 6 is a flowchart illustrating a second example process for improved rendition switching for adaptive bitrate streaming that may be used in accordance with the present disclosure.

FIG. 6 is a flowchart illustrating a second example process for improved rendition switching for adaptive bitrate streaming that may be used in accordance with the present disclosure. In some examples, the process of FIG. 6 may be performed by one or more transmitters (e.g., one or more servers) that transmit a video stream, such as transmitter 100 of FIG. 1. The process of FIG. 6 begins at operation 610, at which encoding of a video stream for transmission is initiated. For example, a transmitter, such as transmitter 100 of FIG. 1, may encode a video stream for transmission to one or more recipients, such as recipients 130A-N of FIG. 1. In some examples, the transmission of the video stream may be requested as part of a broadcast to multiple recipients, such as a large-scale video broadcast. As set forth above, the encoded video stream is transmitted using adaptive bitrate streaming techniques, in which the video stream is encoded using a number of different renditions having different image qualities with respect to one another. For example, the renditions may differ from one another with respect to one or more image quality-related attributes, such as bitrates, resolutions, profiles, frame rates, and others. For example, as shown in FIG. 1, video stream 120 is encoded into three renditions 121, 122, and 123. In some examples, a transmitter may provide, to clients or other recipients, video stream rendition information indicating the available renditions as well as indications of the respective characteristics (e.g., bitrates, resolutions, profiles, frame rates, and others) of each available rendition.

In some examples, the requested video stream may be transmitted using a communications protocol that is commonly employed for adaptive bitrate streaming, such as hypertext transfer protocol (HTTP).

At operation 612, a request for transmission of a portion of the video stream to a first recipient using a selected rendition is received. As set forth above, in some examples, the requested rendition may be selected based, at least in part, on transmission characteristics information. For example, in some cases, when transmission characteristics are generally more favorable (e.g., higher available network bandwidth, lower recipient CPU usage, etc.), a rendition with a generally higher image quality (e.g., higher bitrates, higher resolutions, etc.) may be selected. By contrast, in some cases, when transmission characteristics are generally less favorable (e.g., lower available network bandwidth, higher recipient CPU usage, etc.), a rendition with a generally lower image quality (e.g., higher bitrates, higher resolutions, etc.) may be selected. At operation 614, the requested portion of the video stream is transmitted to the first recipient using the selected rendition.

At operation 616, a request for transmission of a next portion of the video stream to a first recipient using a selected rendition is received. At operation 618, it is determined whether the request received at operation 616 is a request to switch transmission of the video stream to the first recipient from one rendition to another. As set forth above, a determination as to whether to switch renditions may be made based, at least in part, on updated transmission characteristics information. For example, in some cases, when transmission conditions generally remain stable, a determination may be made not to switch renditions. By contrast, when transmission characteristics are generally becoming more favorable (e.g., increasing available network bandwidth, decreasing recipient CPU usage, etc.), a switch to a rendition with a generally higher image quality (e.g., higher bitrates, higher resolutions, etc.) may sometimes be made. By contrast, when transmission characteristics are generally becoming less favorable (e.g., decreasing available network bandwidth, increasing recipient CPU usage, etc.), a switch to a rendition with a generally lower image quality (e.g., higher bitrates, higher resolutions, etc.) may sometimes be made.

If the request received at operation 616 does not request a rendition switch, then the process returns to operation 614, at which the requested portion of the video stream is transmitted to the first recipient using the same rendition as was used in the prior iteration of operation 614. If, on the other hand, the request received at operation 616 does request a rendition switch, then the process proceeds to operation 620, at which it is determined whether a switch-up (i.e., switch to a rendition with a higher image quality) is requested or switch-down (i.e., switch to a rendition with a lower image quality) is requested.

If a switch-up is requested, then, at operation 622, transmission of the video stream to the first recipient is switched to the selected higher image quality rendition at a key frame. The process may then return to operation 614, at which the requested portion of the video stream is transmitted to the first recipient using the selected higher image quality rendition, and, in this example, the requested portion of the video stream will have a key frame as its initial frame.

If, on the other hand, a switch-down is requested, then, at operation 624, transmission of the video stream to the first recipient is switched to the selected lower image quality rendition at an S-frame or at a key frame, for example based on the request received at operation 618. The process may then return to operation 614, at which the requested portion of the video stream is transmitted to the first recipient using the selected lower image quality rendition having either an S-frame or a key frame as its initial frame. As set forth above, for cases in which S-frame switching is employed, the S-frame at which the transmission is switched to the lower quality image rendition may be a special type of frame that is designated to support S-frame switching, which is referred to herein as an S-frame. The S-frame may include rendition switch data indicating that the server device may switch from transmission of a higher image quality rendition to transmission of a lower image quality rendition with the S-frame as the initial frame of the switched-to, lower image quality rendition. In some examples, unlike other frames (i.e., non-key frames), an S-frame may be prohibited from being generated based on temporal motion vector information from its reference frames. Rendition switch indicator data may indicate that temporal motion vector prediction or temporal motion vector prediction and spatial motion vector prediction should be disabled for the S-frame of the lower image quality rendition. Additionally, in some examples, an S-frame may have reference frames that have a higher resolution than the S-frame, and the S-frame may, therefore, be generated at least in part by downscaling pixel information from the higher resolution of the reference frames to the lower resolution of the S-frame. In such examples, after generating and/or decoding the S-frame of the lower quality, switched to rendition, the reference picture buffer of the decoder may be flushed. In some examples, the rendition switch indicator data may indicate that a custom scaling filter should be employed when decoding the first P-frame of the switched-to lower image quality rendition. Accordingly, the decoder of the recipient device may use the specified custom scaling filter to generate the first P-frame of the switched-to rendition.

In some examples, rendition switch indicator data may comprise one or more bits in an uncompressed frame header which include a frame type field or other indication that indicates that a respective frame is a P-frame that supports rendition switching (i.e., is an S-frame).

FIG. 7 is a table illustrating another example framework 700 for rendition switch indicator data that may be used in accordance with various aspects of the present disclosure. In the example depicted in FIG. 7, rendition switch indicator data may comprise the syntax "frame type" and may use 2 bits to indicate a value for the frame type of a particular frame. In various other examples, more or fewer bits may be used to indicate a frame type of the particular encoded frame. As described previously, rendition switch indicator data may be provided in the header and/or in the payload of a frame transmitted from a server computing device to a client computing device receiving an adaptive bitrate video stream. In the example shown in FIG. 7, rendition switch indicator data value 0 may correspond to a frame_type: KEY FRAME, indicating that a frame with rendition switch indicator data value 0 is a self-decodable key frame. Rendition switch indicator data value 1 may correspond to a frame_type: NON KEY FRAME, indicating that a frame with rendition switch indicator data value 1 is a non-key frame. In some examples, a frame with rendition switch indicator data value 1 may be a inter-coded frames that do not support rendition switching (similar to P-frames and B-frames from the H.264 compression standard). Rendition switch indicator data value 2 may correspond to a frame_type: S FRAME, indicating that a frame with rendition switch indicator data value 2 is an S-frame at which renditions may be switched from a higher quality rendition to a lower quality rendition of the video stream. Rendition switch indicator data value 3 may be reserved for future use.

In some examples, rendition switch indicator data may be specified using frame_type syntax and may be set to the values indicated in table 700 to denote the particular frame type. One possible example set of instructions for specifying frame type may include:

```
uncompressed_header( ) {
    ...
    frame_type
    ...
}
```

Additionally, as previously described, an S-frame may include instructions to flush the decoder buffer after decoding the S-frame. Additionally, as described previously S-frames may include instructions to reference only previously decoded frames in the video stream. One possible example implementation for flushing the decoder buffer and referencing only previously decoded frames may include:

```
uncompressed_header( ) {
    ...
    if ( frame_type == KEY_FRAME ) {
        ...
    } else {
        ...
        if ( intra_only == 1 ) {
            ...
        } else {
            if ( frame_type == S_FRAME ) {
                refresh_frame_flags = 0xFF
            } else {
                refresh_frame_flags           f(8)
            }
            for( i = 0; i < 3; i++ ) {
                ref_frame_idx[i]              f(3)
                if ( frame_type == S_FRAME ) {
                    ref_frame_sign_bias[ LAST_FRAME + i ] = 0
                } else {
                    ref_frame_sign_bias[ LAST_FRAME + i ] f(1)
                }
            }
            frame_size_with_refs( )
```

```
            allow_high_precision_mv f(1)
            read_interpolation_filter( )
        }
    }
    ...
}
```

In some examples, S-frames may be required to explicitly specify their resolution since the resolution may not be derived from different renditions. One possible example set of instructions for specifying S-frame resolution may include:

```
frame_size_with_refs( ) {
    for ( i = 0; i < 3; i++ ) {
        if ( frame_type == S_FRAME ) {
            found_ref = 0
        } else {
            found_ref
        }
        ...
    }
    ...
}
```

In some examples, S-frames received by a decoder may require that the segmentation map, loop filter, and probability tables of the decoder be reset. One possible set of instructions for resetting the segmentation map, loop filter, and probability tables upon receipt of an S-frame is depicted below. In the example instructions below, setup_past_independence ( ) is a function that is called to reset the segmentation map, loop filter, and probability tables. setup_past_independence ( ) may reset the probability tables to default values.

```
uncompressed_header( ) {
    ...
    if ( frame_type == KEY_FRAME ) {
        ...
    } else {
        ...
        if ( error_resilient_mode == 0 ) {
            reset_frame_context f(2)
        } else if ( frame_type == S_FRAME ) {
            reset_frame_context = 3
        } else {
            reset_frame_context = 0
        }
        ...
    }
    ...
    if ( frame_type == S_FRAME ||
         Frameisintra || error_resilient_mode ) {
        setup_past_independence ( )
        ...
    }
    ...
}
```

Figure 8:
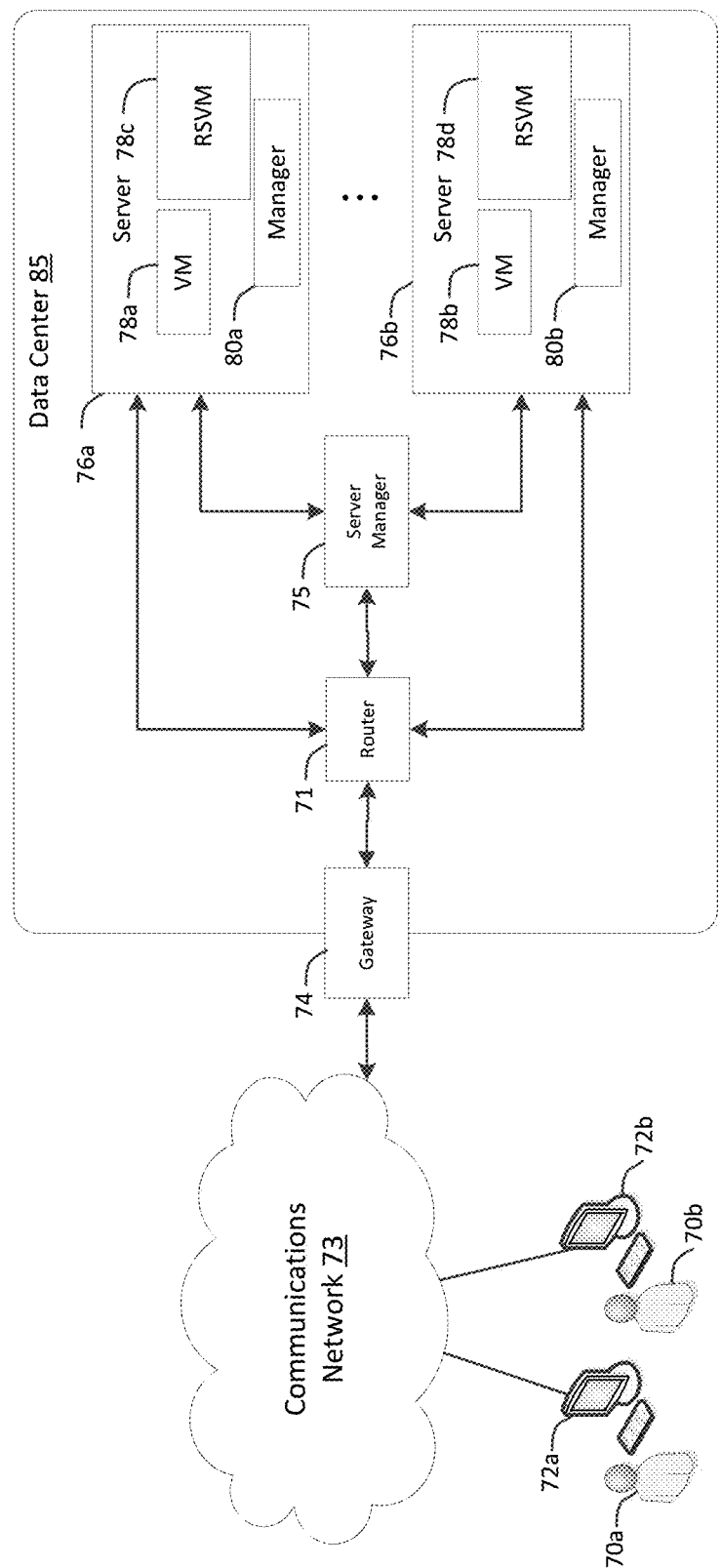
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 8 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

Figure 9:
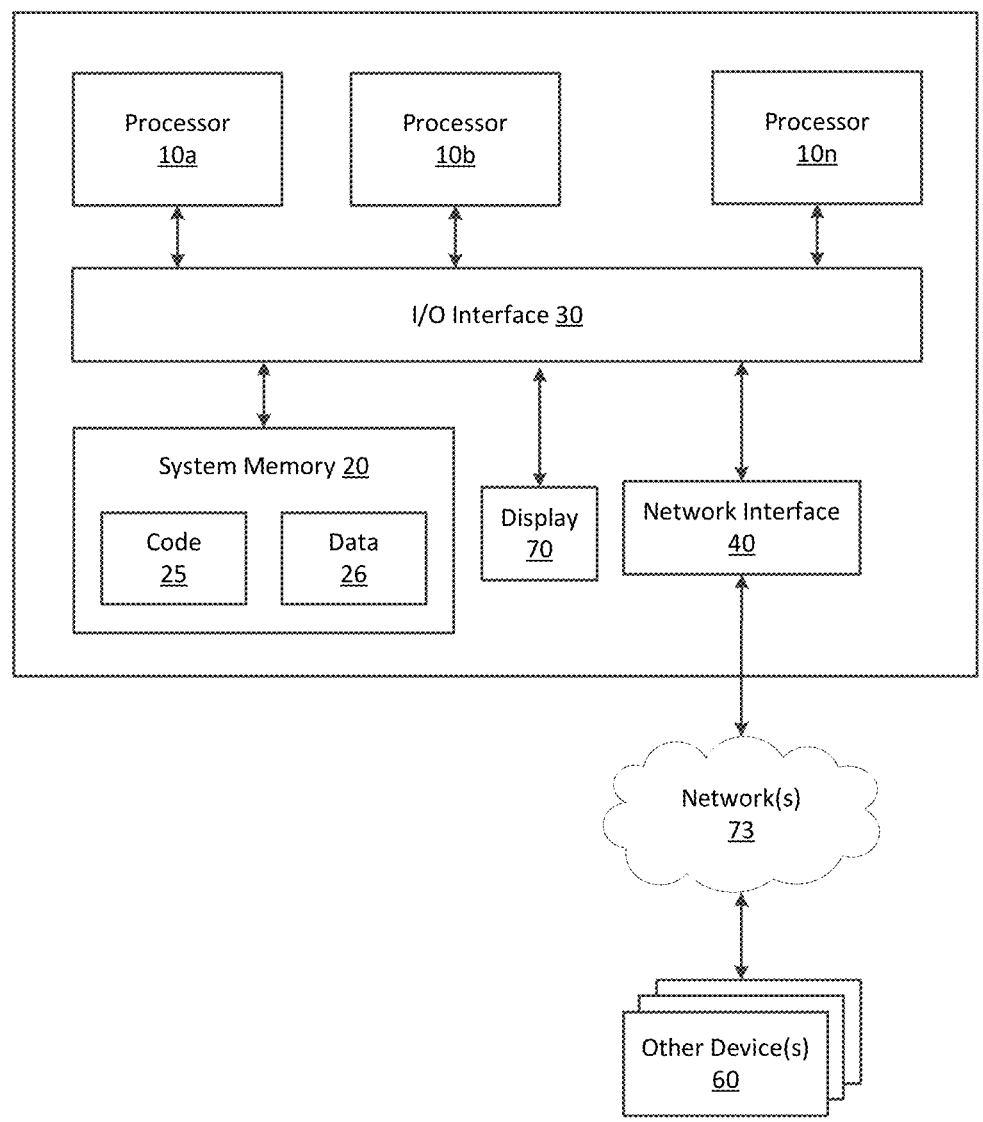
FIG. 9 is a diagram illustrating an example computing system that may be used in accordance with the present disclosure.

In the example data center 85 shown in FIG. 8, a server manager 75 is also employed to at least in part direct various communications to, from and/or between servers 76a and 76b. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30. Computing device 15 may include a display 70 effective to display graphics.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 73, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of switching between renditions of a video transmission, the method comprising:
    encoding, by a server device, video data at a first image quality in a first rendition;
    encoding, by the server device, the video data at a second image quality in a second rendition, wherein the second image quality is lower than the first image quality;
    sending, by the server device, the first rendition to a recipient computing device;
    receiving, by the server device, a request from the recipient computing device to switch from the first rendition to the second rendition;
    determining that first header data of a first inter-coded frame of the video data comprises rendition switch indicator data that indicates that the video transmission cannot be switched to a lower image quality rendition at the first inter-coded frame;
    determining that second header data of a second inter-coded frame of the video data comprises rendition switch indicator data that indicates that the video transmission can be switched to the lower image quality rendition at the second inter-coded frame, wherein the second inter-coded frame occurs later in the video transmission relative to the first inter-coded frame;
    ceasing to send the first rendition to the recipient computing device;
    sending the second rendition to the recipient computing device beginning with the second inter-coded frame;
    identifying, by the recipient computing device, data in the second header data providing an indication to disable temporal motion vector prediction for decoding of the second inter-coded frame; and disabling, by the recipient computing device, temporal motion vector prediction for the decoding of the second inter-coded frame.

2. The method of claim 1, further comprising:

identifying, by the recipient computing device, data in the second header data specifying a resolution of the second inter-coded frame.

3. The method of claim 1, further comprising:

determining, by the recipient computing device, that network conditions experienced by the recipient computing device have improved;

requesting, by the recipient computing device, a higher image quality rendition;

ceasing to send the second rendition to the recipient computing device; and sending the higher image quality rendition to the recipient computing device beginning with an intra-coded frame that resets a decoding process, such that frames following the intra-coded frame do not reference any frame prior to the intra-coded frame.

4. A method, comprising:

encoding video data at a first image quality in a first rendition;

encoding the video data at a second image quality in a second rendition, wherein the second image quality is lower than the first image quality;

sending the first rendition to a recipient computing device;

receiving a request to send the second rendition;

determining that first indicator data of a first inter-coded frame indicates that the first inter-coded frame supports sending of a lower image quality rendition beginning with the first inter-coded frame;

determining that the first indicator data of the first inter-coded frame provides an indication to disable temporal motion vector prediction for decoding a corresponding inter-coded frame of the second rendition; and sending the second rendition to the recipient computing device.

5. The method of claim 4, further comprising determining that second indicator data of a second inter-coded frame indicates that the second inter-coded frame does not support sending a different rendition beginning with the second inter-coded frame.

6. The method of claim 4, further comprising encoding the first inter-coded frame with resolution data that specifies a resolution of the first inter-coded frame in the second rendition.

7. The method of claim 4, further comprising:

encoding the video data at a third image quality in a third rendition, wherein the third image quality is higher than the second image quality;

receiving a second request to send the third rendition; and sending the third rendition to the recipient computing device, wherein an initial frame of the third rendition sent to the recipient computing device is a key frame.

8. The method of claim 4, further comprising determining that the first indicator data of the first inter-coded frame provides an indication to use a pre-defined scaling filter for the corresponding inter-coded frame of the second rendition.

9. The method of claim 8, further comprising determining that the first indicator data of the first inter-coded frame provides an indication to delete content of a reference picture buffer after decoding the first inter-coded frame.

10. A system, comprising:

at least one processor; and a non-transitory computer-readable memory storing instructions that, when executed by the at least one processor are effective to program the at least one processor to perform a method comprising:

encoding video data at a first image quality in a first rendition;

encoding the video data at a second image quality in a second rendition, wherein the second image quality is lower than the first image quality;

sending the first rendition to a recipient computing device;

receiving a request to send the second rendition;

determining that first indicator data of a first inter-coded frame indicates that the first inter-coded frame supports sending of a lower image quality rendition beginning with the first inter-coded frame;

determining that the first indicator data of the first inter-coded frame provides an indication to disable temporal motion vector prediction for decoding a corresponding inter-coded frame of the second rendition; and sending the second rendition to the recipient computing device.

11. The system of claim 10, wherein the instructions, when executed by the at least one processor are effective to program the at least one processor to perform the method further comprising determining that second indicator data of a second inter-coded frame indicates that the second inter-coded frame does not support sending a different rendition beginning with the second inter-coded frame.

12. The system of claim 10, wherein the instructions, when executed by the at least one processor are effective to program the at least one processor to perform the method further comprising encoding the first inter-coded frame with resolution data that specifies a resolution of the first inter-coded frame in the second rendition.

13. The system of claim 10, wherein the instructions, when executed by the at least one processor are effective to program the at least one processor to perform the method further comprising:

encoding the video data at a third image quality in a third rendition, wherein the third image quality is higher than the second image quality;

receiving a second request to send the third rendition; and sending the third rendition to the recipient computing device, wherein an initial frame of the third rendition sent to the recipient computing device is a key frame.

14. The system of claim 10, wherein the instructions, when executed by the at least one processor are effective to program the at least one processor to perform the method further comprising determining that the first indicator data of the first inter-coded frame provides an indication to use a pre-defined scaling filter for the corresponding inter-coded frame of the second rendition.

15. The system of claim 14, wherein the instructions, when executed by the at least one processor are effective to program the at least one processor to perform the method further comprising determining that the first indicator data of the first inter-coded frame provides an indication to delete content of a reference picture buffer after decoding the first inter-coded frame.

16. The system of claim 10, wherein the instructions, when executed by the at least one processor are effective to program the at least one processor to perform the method further comprising sending instructions for the recipient computing device to reset a probability table to default values after decoding the first inter-coded frame.

17. The system of claim 10, wherein the instructions, when executed by the at least one processor are effective to program the at least one processor to perform the method further comprising sending instructions for the recipient computing device to reset a segmentation map, a loop filter, and one or more probability tables upon receipt of the first inter-coded frame.

* * * * *